United States Patent
Hong et al.

(10) Patent No.: US 7,901,804 B2
(45) Date of Patent: Mar. 8, 2011

(54) FERROELECTRIC MEDIA MANUFACTURING METHOD THEREOF AND INFORMATION STORAGE DEVICE USING THE SAME

(75) Inventors: Seung Bum Hong, Seongnam-si (KR); Simon Buehlmann, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 206 days.

(21) Appl. No.: 11/953,096

(22) Filed: Dec. 10, 2007

(65) Prior Publication Data
US 2008/0220247 A1    Sep. 11, 2008

(30) Foreign Application Priority Data
Mar. 7, 2007    (KR) .................. 10-2007-0022553

(51) Int. Cl.
*G11B 5/66*    (2006.01)
(52) U.S. Cl. .................................................. 428/836
(58) Field of Classification Search .................. None
See application file for complete search history.

(56) References Cited

U.S. PATENT DOCUMENTS

| | | | | |
|---|---|---|---|---|
| 5,936,832 A | * | 8/1999 | Saito et al. | 361/321.4 |
| 6,645,779 B2 | * | 11/2003 | Hong | 438/3 |
| 6,649,424 B2 | * | 11/2003 | Mort et al. | 438/3 |
| 6,919,212 B2 | * | 7/2005 | Oh et al. | 438/3 |
| 2005/0133841 A1 | * | 6/2005 | Jung et al. | 257/295 |
| 2007/0107774 A1 | * | 5/2007 | Jin et al. | 136/258 |

FOREIGN PATENT DOCUMENTS

| | | |
|---|---|---|
| JP | 10-040599 | 2/1998 |
| KR | 1020040036380 A | 4/2004 |

OTHER PUBLICATIONS

Counter Korean Office Action in KR application No. 10-2007-0022553 (inventor: Seung Bum Hong) mailed Mar. 24, 2008, with partial English translation.

* cited by examiner

*Primary Examiner* — Holly Rickman
(74) *Attorney, Agent, or Firm* — Sughrue Mion, PLLC

(57) ABSTRACT

A ferroelectric medium, a manufacturing method thereof and an information storage device are disclosed. The manufacturing method includes the steps of: forming an electrode layer on a substrate; forming an insulation layer on the electrode; and forming on the insulation layer a ferroelectric layer. Dielectric breakdown does not occur at a high voltage by forming the insulation layer.

16 Claims, 4 Drawing Sheets

FERROELECTRIC MEDIA MANUFACTURING METHOD THEREOF AND INFORMATION STORAGE DEVICE USING THE SAME

BACKGROUND OF THE INVENTION

1. Field of the Invention

The present invention relates to a ferroelectric medium, a manufacturing method thereof, and an information storage device using the ferroelectric medium. In particular, it relates to a ferroelectric medium having an insulating layer which can prevent dielectric breakdown at a high voltage.

2. Description of the Related Art

As generally known in the art, ferroelectric material has a spontaneous polarity which may be reversed by application of an electric field. The ferroelectric media is a non-volatile recording media with a higher capacity and is used for recording, editing and storing information using the property of the ferroelectric material.

FIG. 1 illustrates a cross-sectional view of the conventional ferroelectric medium.

As illustrated in FIG. 1, the conventional ferroelectric medium includes a substrate 100, a bottom electrode layer 110 formed on the substrate 100, and a ferroelectric layer 130 which is formed on the bottom electrode layer 110.

In order to write/read the data onto/from the ferroelectric media, there are included a probe 20 for writing/reading the data onto/from the ferroelectric layer 130 in a contact or a non-contact manner and a scanner for actuating the probe 20. Further, the scanner includes a cantilever 21 for supporting the probe 20 and a microelectromechanical system (MEMS) actuator for actuating the cantilever 21.

However, in the conventional ferroelectric media having the above-described structure, there is the problem that dielectric breakdown often occurs in the ferroelectric layer, which is a thin $PbTiO_3$ film, due to a strong electric field generated when a switching voltage of high potential is applied to the interface between the bottom electrode (Pt) and the ferroelectric layer ($PbTiO_3$).

SUMMARY OF THE INVENTION

The present invention provides a ferroelectric medium having an insulation layer formed between an electrode layer and a ferroelectric layer. The ferroelectric medium does not undergo dielectric breakdown at a high voltage.

According to one embodiment, there is provided a manufacturing method of the ferroelectric medium.

The present invention provides an information storage device including a ferroelectric medium having an insulation layer formed between an electrode and a ferroelectric layer, which prevents dielectric breakdowns at high voltage.

There is also provided a manufacturing method of a ferroelectric medium, which comprises the steps of: forming an electrode layer on a substrate; forming an insulation layer on the bottom electrode; and forming, on the insulation layer, a ferroelectric layer.

In an embodiment, the insulation layer is formed with a thickness ranging from 0.5 nm to 50 nm.

In an embodiment, the insulation layer is formed using any one of insulation materials selected from the group consisting of $ZrO_2$, $TiO_2$, MgO, $SrTiO_3$, $Al_2O_3$, $HfO_2$, NbO, $SiO_2$, and $Si_3N_4$.

In an embodiment, the electrode layer is formed to have a thickness ranging from 0.5 nm to 100 nm using any one of metallic materials selected from the group consisting of Pt, Ir, Ru, Al, Au, $RuO_2$, $SrRuO_3$, and $IrO_2$.

In an embodiment, the ferroelectric layer is formed to have a thickness ranging from 0.5 nm to 100 nm using any one of ferroelectric materials selected from the group consisting of $PbTiO_3$, $Pb(Zr,Ti)O_3$, $LiNbO_3$, $LiTaO_3$, $BiFeO_3$, and PVDF (polyvinylidene difluoride).

In an embodiment, the manufacturing method of the ferroelectric media further includes the step of forming a adhesion layer formed between the substrate and the bottom electrode layer.

In an embodiment, the adhesion layer is formed to have a thickness ranging from 0.5 nm to 100 nm using any one of adhesive materials selected from the group consisting of Ti, Zr, $TiO_2$, $ZrO_2$, Hf, and $HfO_2$.

Also, there is provided a ferroelectric medium including: a substrate; an electrode layer formed on the substrate; an insulation layer formed on the electrode layer; and a ferroelectric layer which is formed on the insulation layer.

In an embodiment, the insulation layer is formed to have a thickness ranging from 0.5 nm to 50 nm.

In an embodiment, the insulation layer is formed using any one of insulation materials selected from the group consisting of $ZrO_2$, $TiO_2$, MgO, $SrTiO_3$, $Al_2O_3$, $HfO_2$, NbO, $SiO_2$, and $Si_3N_4$.

In an embodiment, the electrode layer is formed to have a thickness ranging from 0.5 nm to 100 nm using any one of metallic materials selected from the group consisting of Pt, Ir, Ru, Al, Au, $RuO_2$, $SrRuO_3$, and $IrO_2$.

In an embodiment, the ferroelectric layer is formed to have a thickness ranging from 0.5 nm to 100 nm using any one of ferroelectric materials selected from the group consisting of $PbTiO_3$, $Pb(Zr,Ti)O_3$, $LiNbO_3$, $LiTaO_3$, $BiFeO_3$, and PVDF.

In an embodiment, the ferroelectric medium further comprises an adhesion layer formed between the substrate and the bottom electrode layer.

In an embodiment, the adhesion layer is formed to have a thickness ranging from 0.5 nm to 100 nm using any one of adhesive materials selected from the group consisting of Ti, Zr, $TiO_2$, $ZrO_2$, Hf, and $HfO_2$.

There is also provided a storage device including the ferromagnetic recording medium as described above.

Accordingly, by means of the insulation layer provided between the electrode layer and the ferroelectric layer, it is possible to prevent dielectric breakdowns in the ferroelectric layer, even when a high voltage is applied to an interface between the electrode layer and the ferroelectric layer.

BRIEF DESCRIPTION OF THE DRAWINGS

The above and other features and advantages of the present invention will be more apparent from the following detailed description taken in conjunction with the accompanying drawings, in which.

DETAILED DESCRIPTION OF THE PREFERRED EMBODIMENTS

Figure 1:
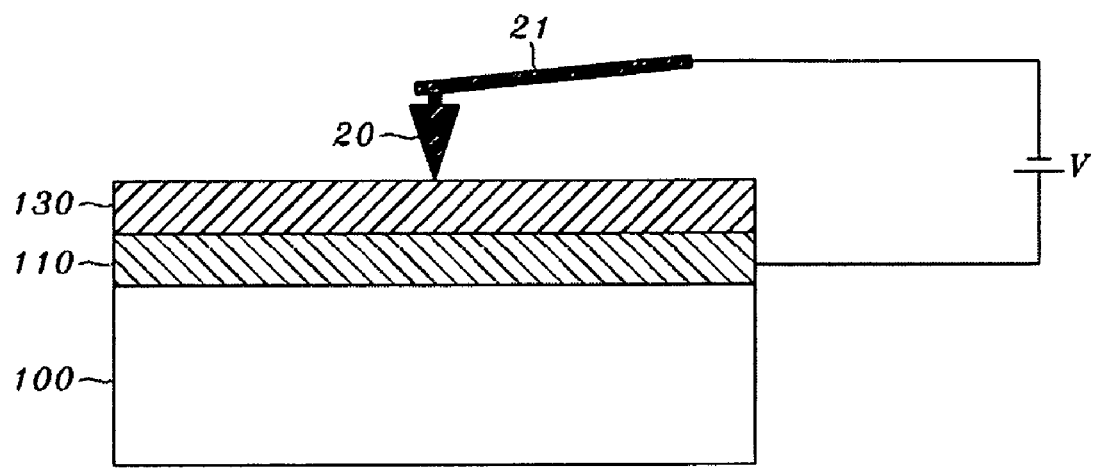
FIG. 1 is a cross-sectional view of a conventional ferroelectric medium.

Hereinafter, exemplary embodiments of the present invention will be described with reference to the accompanying drawings. In the following description and drawings, the same reference numerals are used to designate the same or similar components, and so repetition of the description on the same or similar components will be omitted.

First Embodiment of the Manufacturing Method

Figure 2A:
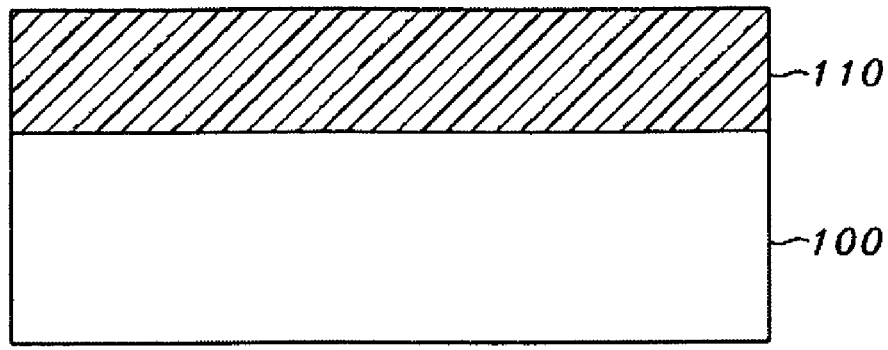
FIGS. 2A-2C are cross-sectional views illustrating a manufacturing process of the ferroelectric medium according to a first embodiment of the present invention.
Figure 2B:
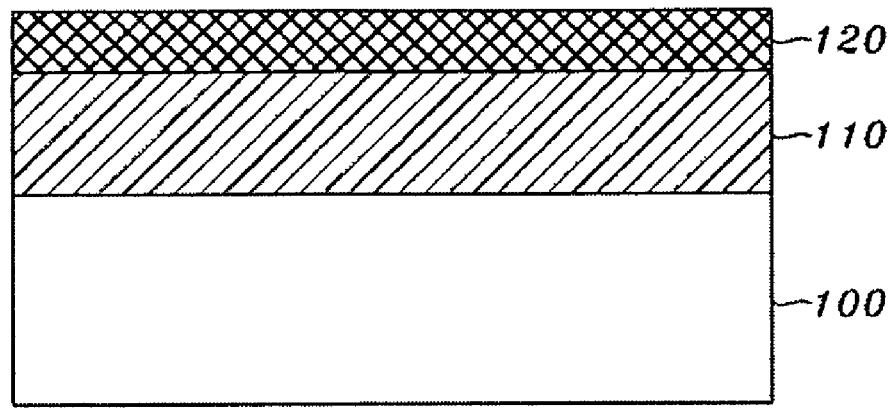
Figure 2C:
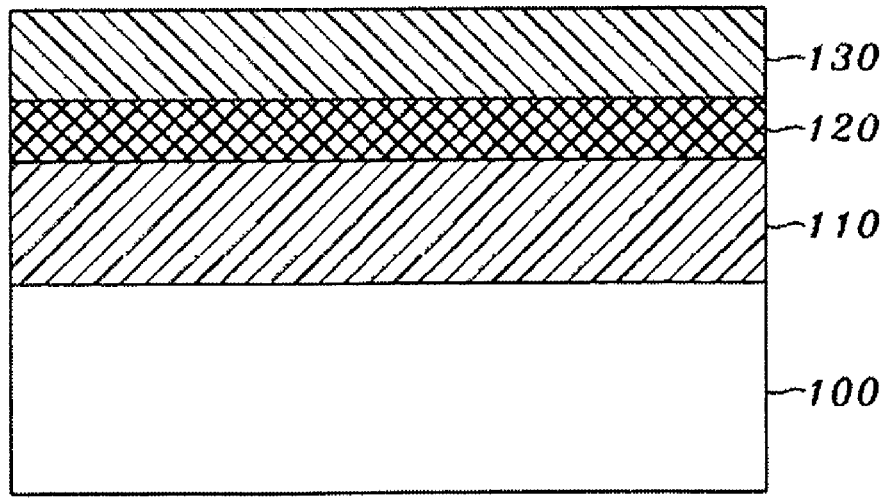

FIGS. 2A-2C are cross-sectional views illustrating a manufacturing process of a ferroelectric medium according to a first embodiment of the present invention.

As illustrated in FIG. 2A, an electrode layer 110 is formed on a substrate 100. Here, the substrate 100 may be a glass substrate, a silicon substrate, a polymer substrate, etc. The electrode layer 110 may be provided to have a thickness ranging from 0.5 nm to 100 nm using any one of metallic materials which may be exemplified by, but are not limited to, Pt, Ir, Ru, Al, Au, $RuO_2$, $SrRuO_3$, and $IrO_2$.

Thereafter, as illustrated in FIG. 2B, an insulation layer 120 is formed on the electrode layer 110. The insulation layer 120 may be provided to have a thickness ranging from 0.5 nm to 50 nm using any one of insulation materials which may be exemplified by, but are not limited to, $ZrO_2$, $TiO_2$, MgO, $SrTiO_3$, $Al_2O_3$, $HfO_2$, NbO, $SiO_2$, and $Si_3N_4$. The insulation layer 120 serves to prevent dielectric breakdowns at high voltage.

Next, as illustrated in FIG. 2C, a ferroelectric layer 130, onto which data are written, is formed on the insulation layer 120. The ferroelectric layer 130 may be provided to have a thickness ranging from 0.5 nm to 100 nm using any one of ferroelectric materials selected from $PbTiO_3$, $Pb(Zr,Ti)O_3$, $LiNbO_3$, $LiTaO_3$, $BiFeO_3$, and PVDF (polyvinylidene difluoride).

Second Embodiment of the Manufacturing Method

Figure 3A:
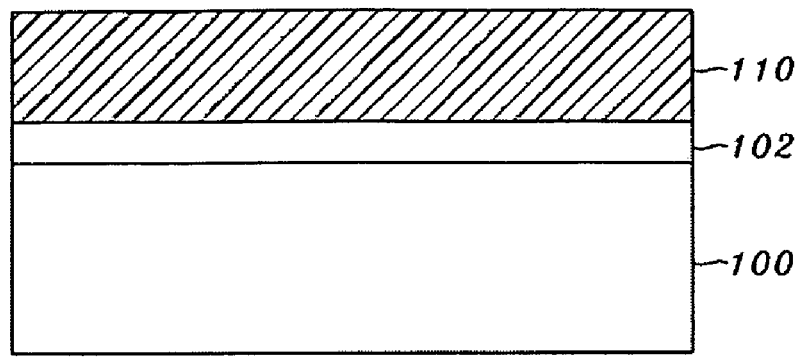
FIGS. 3A-3C are cross-sectional views illustrating a manufacturing process of the ferroelectric medium according to a second embodiment of the present invention.
Figure 3B:
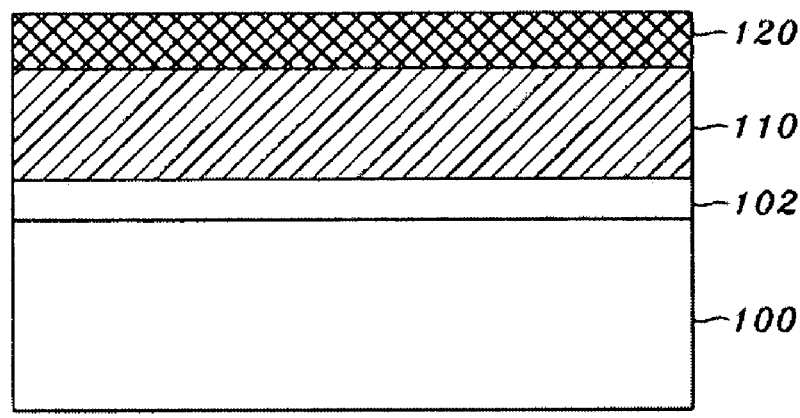
Figure 3C:
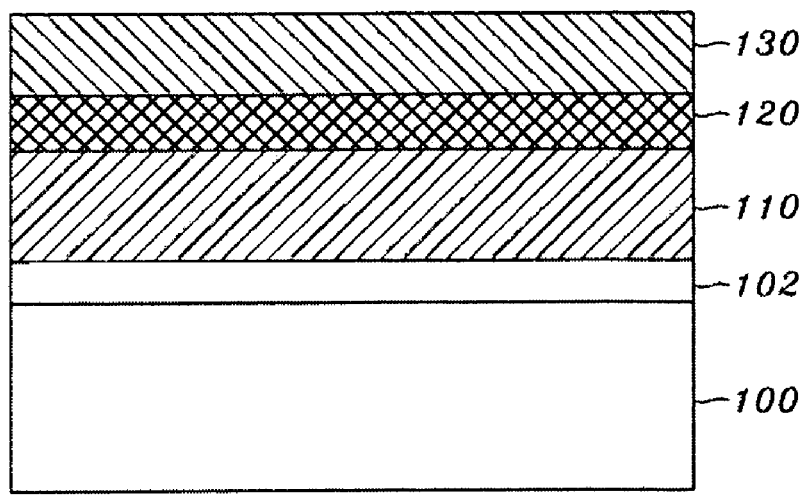

FIGS. 3A-3C are cross-sectional views illustrating the manufacturing process of a ferroelectric medium according to a second embodiment of the present invention.

In the manufacturing method of the ferroelectric medium according to the second embodiment, an adhesion layer 102 is additionally formed between the substrate 100 and the electrode layer 110.

Here, the adhesion layer 102 may be provided to have a thickness ranging from 0.5 nm to 100 nm using any one of adhesion materials which may be exemplified by, but are not limited to, Ti, Zr, $TiO_2$, $ZrO_2$, Hf, and $HfO_2$. Also, the insulation layer 120 formed between the bottom electrode layer 110 and the ferroelectric layer 130 serves to prevent dielectric breakdowns at high voltage. The insulation layer 120 may be provided to have a thickness ranging from 0.5 nm to 50 nm using any one of the insulation material comprising $ZrO_2$, $TiO_2$, MgO, $SrTiO_3$, $Al_2O_3$, $HfO_2$, NbO, $SiO_2$, and $Si_3N_4$.

Ferroelectric Media

The ferroelectric medium according to an embodiment of the present invention includes: a substrate 100; an electrode layer 110 formed on the substrate 100; an insulation layer 120 having a thickness ranging from 0.5 nm to 50 nm and formed on the electrode layer 110; and a ferroelectric layer 130 formed on the insulation layer 120. Data are written on the ferroelectric layer 130.

Here, the insulation layer 120 is formed using any one of the insulation materials selected from $ZrO_2$, $TiO_2$, MgO, $SrTiO_3$, $Al_2O_3$, $HfO_2$, NbO, $SiO_2$, and $Si_3N_4$.

The electrode layer 110 may be provided to have a thickness ranging from 0.5 nm to 100 nm using any one of metallic materials, which may be exemplified by, but are not limited to, Pt, Ir, Ru, Al, Au, $RuO_2$, $SrRuO_3$, and $IrO_2$.

Also, the ferroelectric layer 130 may be formed to have a thickness ranging from 0.5 nm to 100 nm using any one of ferroelectric materials, which may be exemplified by, but are not limited to, $PbTiO_3$, $Pb(Zr,Ti)O_3$, $LiNbO_3$, $LiTaO_3$, $BiFeO_3$, and PVDF.

Also, the ferroelectric media of an embodiment of the present invention may further comprise the adhesion layer 102 formed between the substrate 100 and the electrode layer 110. The adhesion layer 102 may be provided to have a thickness ranging from 0.5 to 100 nm using any one of the adhesion materials which may be exemplified by, but are not limited to, Ti, Zr, $TiO_2$, $ZrO_2$, Hf, and $HfO_2$.

Information Storage Device

The information storage device according to an embodiment of the present invention includes the recording medium onto which the data are recorded and a probe for writing/reading the data onto/from the recording medium, wherein the recording medium comprises: a substrate 100; a electrode layer 110 formed on the substrate 100; an insulation layer 120 formed on the electrode layer, the insulation layer 120 having a thickness of between 0.5 nm and 50 nm and being formed of an insulation material selected from $ZrO_2$, $TiO_2$, MgO, $SrTiO_3$, $Al_2O_3$, $HfO_2$, NbO, $SiO_2$, and $Si_3N_4$; and a ferroelectric layer 130 which is formed on the insulation layer 120 and onto which the data are written.

Here, the electrode layer 110 may be formed to have a thickness ranging from 0.5 nm to 100 nm using any one of metallic materials which may be exemplified by, but are not limited to, comprising Pt, Ir, Ru, Al, Au, $RuO_2$, $SrRuO_3$, and $IrO_2$.

Also, the ferroelectric layer 130 may be provided to have a thickness ranging from 0.5 nm to 100 nm using any one of the ferroelectric materials which may be exemplified by, but are not limited to, $PbTiO_3$, $Pb(Zr,Ti)O_3$, $LiNbO_3$, $LiTaO_3$, $BiFeO_3$, and PVDF.

Further, the ferroelectric medium may further comprise an adhesion layer 102 formed between the substrate 100 and the electrode layer 110. Here, the adhesion layer 102 may be formed to have a thickness ranging from 0.5 nm to 100 nm using any one of the materials selected from Ti, Zr, $TiO_2$, $ZrO_2$, Hf, and $HfO_2$.

Test Results

Figure 4:
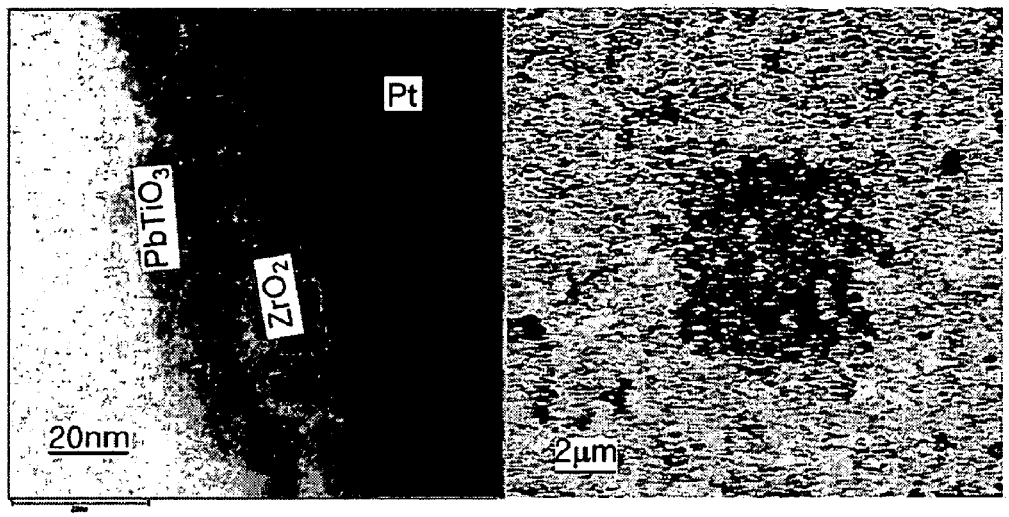
FIG. 4 is a photograph taken by a transmission electron microscope, which shows a cross-section of the ferroelectric medium according to an embodiment of the present invention.
Figure 5:
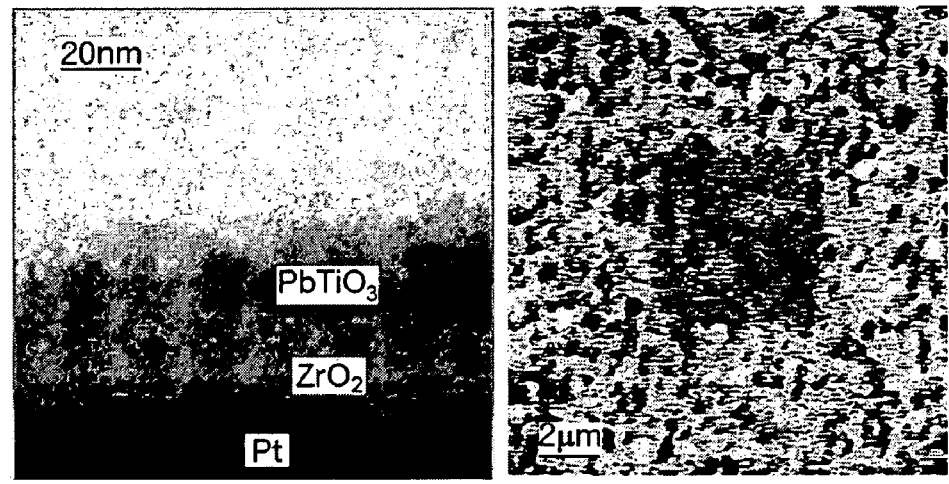
FIG. 5 is a PFM (piezoelectric force microscopy) photograph illustrating the configuration of information recording.

FIGS. 4 and 5 are image photographs illustrating test results of the ferroelectric media according to an embodiment of the present invention.

FIG. 4 is a transmission electron microscopic image of a cross-section of the ferroelectric medium according to an embodiment of the present invention, when a switching voltage of 4 volts was applied to an interface between the electrode layer (Pt) and the ferroelectric layer ($PbTiO_3$). The ferroelectric medium contains an insulation layer ($ZrO_2$) formed between the electrode layer (Pt) and the ferroelectric layer ($PbTiO_3$). As may be seen from the image of FIG. 4, no dielectric breakdown occurred in the ferroelectric layer ($PbTiO_3$), because an insulation layer is provided formed between the electrode (Pt) and the ferroelectric layer ($PbTiO_3$). Even though a particular embodiment of a ferromagnetic medium containing a Pt electrode layer, a $ZrO_2$ insulation layer and a $PbTiO_3$ ferroelectric layer was tested and described in the experiment, other embodiments of the ferroelectric medium exhibit same or similar effects.

FIG. 5 is a piezoelectric force microscopic image of a cross-section of the ferroelectric medium according to an embodiment of the present invention, when a switching voltage of 3 volts was applied to an interface between the electrode layer (Pt) and the ferroelectric layer ($PbTiO_3$). The ferroelectric medium contains an insulation layer ($ZrO_2$) formed between the electrode layer (Pt) and the ferroelectric layer ($PbTiO_3$). As may be seen from the image of FIG. 5, no dielectric breakdown occurred in the ferroelectric layer ($PbTiO_3$), because an insulation layer is provided formed between the electrode (Pt) and the ferroelectric layer ($PbTiO_3$). Even though a particular embodiment of a ferromagnetic medium containing a Pt electrode layer, a $ZrO_2$ insulation layer and a $PbTiO_3$ ferroelectric layer was tested and described in the experiment, other embodiments of the ferroelectric medium exhibit same or similar effects.

As described hereinbefore, the ferroelectric media according to embodiments of the present invention do not experience dielectric breakdown due to an insulation layer provided between the electrode and the ferroelectric layer, which reduces field strength.

Although embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A ferroelectric medium comprising:
a substrate;
an electrode layer formed on said substrate;
an insulation layer formed on said electrode layer; and
a ferroelectric layer formed on a surface of said insulation layer, wherein the ferroelectric layer has a first surface and a second surface which is opposite to the first surface, and wherein the first surface of the ferroelectric layer is in contact with the surface of said insulation layer and the second surface of the ferroelectric layer is exposed so that the second surface of the ferroelectric layer is accessed by a probe to write/read data onto/from the ferroelectric layer.

2. The ferroelectric medium as claimed in claim 1, wherein said insulation layer has a thickness of 0.5 nm to 50 nm.

3. The ferroelectric medium as claimed in claim 1, wherein said insulation layer is formed of any one of insulation materials selected from the group consisting of $ZrO_2$, $TiO_2$, MgO, $SrTiO_3$, $Al_2O_3$, $HfO_2$, NbO, $SiO_2$, and $Si_3N_4$.

4. The ferroelectric medium as claimed in claim 2, wherein said insulation layer is formed of any one of insulation materials selected from the group consisting of $ZrO_2$, $TiO_2$, MgO, $SrTiO_3$, $Al_2O_3$, $HfO_2$, NbO, $SiO_2$, and $Si_3N_4$.

5. The ferroelectric medium as claimed in claim 1, wherein said electrode layer has a thickness ranging from 0.5 nm to 100 nm and is formed of any one of metallic materials selected from the group consisting of Pt, Ir, Ru, Al, Au, $RuO_2$, $SrRuO_3$, and $IrO_2$.

6. The ferroelectric medium as claimed in claim 1, wherein said ferroelectric layer has a thickness ranging from 0.5 to 100 nm and is formed of any one of ferroelectric materials selected from the group consisting of $PbTiO_3$, $Pb(Zr,Ti)O_3$, $LiNbO_3$, $LiTaO_3$, $BiFeO_3$, and polyvinylidene difluoride (PVDF).

7. The ferroelectric medium as claimed in claim 1, further comprising an adhesion layer provided between said substrate and said electrode layer.

8. The ferroelectric medium as claimed in claim 7, wherein said adhesion layer has a thickness ranging from 0.5 nm to 100 nm and is formed of any one of adhesive materials selected from the group consisting of Ti, Zr, $TiO_2$, $ZrO_2$, Hf, and $HfO_2$.

9. A storage device comprising a ferroelectric recording medium, the ferroelectric recording medium comprising:
a substrate;
an electrode layer formed on said substrate;
an insulation layer formed on said electrode layer; and
a ferroelectric layer formed on a surface of said insulation layer, wherein the ferroelectric layer has a first surface and a second surface which is opposite to the first surface, and wherein the first surface of the ferroelectric layer is in contact with the surface of said insulation layer and the second surface of the ferroelectric layer is exposed so that the second surface of the ferroelectric layer is accessed by a probe to write/read data onto/from the ferroelectric layer.

10. The storage device of claim 9, wherein the insulation layer has a thickness of 0.5 nm to 50 nm.

11. The storage device of claim 9, wherein the insulation layer is formed of any one of insulation materials selected from the group consisting of $ZrO_2$, $TiO_2$, MgO, $SrTiO_3$, $Al_2O_3$, $HfO_2$, NbO, $SiO_2$, and $Si_3N_4$.

12. The storage device of claim 10, wherein the insulation layer is formed of any one of insulation materials selected from the group consisting of $ZrO_2$, $TiO_2$, MgO, $SrTiO_3$, $Al_2O_3$, $HfO_2$, NbO, $SiO_2$, and $Si_3N_4$.

13. The storage device of claim 9, wherein the electrode layer has a thickness ranging from 0.5 nm to 100 nm and is formed of any one of metallic materials selected from the group consisting of Pt, Ir, Ru, Al, Au, $RuO_2$, $SrRuO_3$, and $IrO_2$.

14. The storage device of claim 9, wherein the ferroelectric layer has a thickness ranging from 0.5 to 100 nm and is formed of any one of ferroelectric materials selected from the group consisting of $PbTiO_3$, $Pb(Zr,Ti)O_3$, $LiNbO_3$, $LiTaO_3$, $BiFeO_3$, and polyvinylidene difluoride (PVDF).

15. The storage device of claim 9, further comprising an adhesion layer provided between the substrate and the electrode layer.

16. The storage device of claim 15, wherein said adhesion layer has a thickness ranging from 0.5 nm to 100 nm and is formed of any one of adhesive materials selected from the group consisting of Ti, Zr, $TiO_2$, $ZrO_2$, Hf, and $HfO_2$.

* * * * *